(12) United States Patent
Mertz et al.

(10) Patent No.: US 7,044,627 B2
(45) Date of Patent: May 16, 2006

(54) DISPLAY RETAINER AND BACKLIGHT

(76) Inventors: John C. Mertz, 11616 Red Fox Dr., Maple Grove, MN (US) 55369; Cory L. Grabinger, 6345 Eagle Lake Dr., Maple Grove, MN (US) 55369

(*) Notice: Subject to any disclaimer, the term of this patent is extended or adjusted under 35 U.S.C. 154(b) by 130 days.

(21) Appl. No.: 10/448,935

(22) Filed: May 30, 2003

(65) Prior Publication Data

US 2004/0240193 A1  Dec. 2, 2004

(51) Int. Cl.
*F21V 8/00* (2006.01)

(52) U.S. Cl. ............... 362/621; 362/631; 362/634; 362/606; 362/610; 362/555; 362/558; 362/561

(58) Field of Classification Search ............ 362/26, 362/31, 226, 318; 349/58, 60, 61, 62, 63, 349/64, 65, 67
See application file for complete search history.

(56) References Cited

U.S. PATENT DOCUMENTS

| | | |
|---|---|---|
| 4,367,467 A | 1/1983 | Emile, Jr. |
| 4,422,728 A | 12/1983 | Andreaggi |
| 4,528,617 A * | 7/1985 | Blackington ............ 362/558 |
| 4,642,627 A | 2/1987 | Hodsdon |
| 4,714,983 A | 12/1987 | Lang |
| 4,755,035 A | 7/1988 | Kopish et al. |
| 4,907,132 A | 3/1990 | Parker |
| 5,036,435 A * | 7/1991 | Tokuda et al. ............ 362/31 |
| 5,079,675 A | 1/1992 | Nakayama |
| 5,124,890 A | 6/1992 | Choi et al. |
| 5,136,480 A * | 8/1992 | Pristash et al. ............ 362/31 |
| 5,375,043 A | 12/1994 | Tokunaga |
| D366,429 S | 1/1996 | Dexter et al. |
| 5,613,751 A | 3/1997 | Parker et al. |
| 5,618,096 A | 4/1997 | Parker et al. |
| 5,664,862 A | 9/1997 | Redmond et al. |
| D393,214 S | 4/1998 | Ingebritson et al. |
| 5,764,200 A | 6/1998 | Odmark |
| 5,831,697 A | 11/1998 | Evanicky et al. |
| 5,856,855 A | 1/1999 | Mol et al. |
| 5,876,107 A | 3/1999 | Parker et al. |
| 5,921,652 A | 7/1999 | Parker et al. |
| 5,947,578 A | 9/1999 | Ayres |
| 5,975,711 A | 11/1999 | Parker et al. |
| 6,030,089 A * | 2/2000 | Parker et al. ............ 362/103 |

(Continued)

OTHER PUBLICATIONS

"SolidState™ and MicroLens™ Patented Backlighting Technology for Information Displays," Global Lighting Technologies Inc., 2 pages, May 2002.

(Continued)

*Primary Examiner*—Thomas M. Sember
(74) *Attorney, Agent, or Firm*—Gregory M. Ansems

(57) ABSTRACT

Backlighting devices and methods for supporting and illuminating a display panel are disclosed. A display retainer and backlight device in accordance with an illustrative embodiment of the present invention may comprise one or more light pipes operatively coupled to a retainer housing that supports and illuminates an attached display panel. The retainer housing includes an optical waveguide that receives light collected by the one or more light pipes. A light scattering element and reflector may be employed to disperse and reflect the light rays to illuminate the backside of the display panel. A slot extending through a portion of the retainer housing may be configured to tightly receive an elastomeric zebra-strip, which electrically connects the circuit board to the display panel. A clip, tab or other fastening mechanism may be used to secure the retainer housing and display panel to the circuit board.

57 Claims, 10 Drawing Sheets

U.S. PATENT DOCUMENTS

| | | |
|---|---|---|
| 6,042,241 A | 3/2000 | Lengyel |
| 6,068,381 A | 5/2000 | Ayres |
| 6,079,838 A | 6/2000 | Parker et al. |
| 6,091,474 A | 7/2000 | Middleton et al. |
| 6,175,396 B1 | 1/2001 | Kim et al. |
| 6,238,076 B1 | 5/2001 | Pascale et al. |
| 6,275,339 B1 | 8/2001 | Chazallet et al. |
| 6,283,602 B1 | 9/2001 | Kawaguchi et al. |
| 6,315,440 B1 | 11/2001 | Satoh |
| 6,431,716 B1 | 8/2002 | Kusakabe |
| 6,439,731 B1 | 8/2002 | Johnson et al. |
| 6,443,582 B1 | 9/2002 | Tarne et al. |
| 6,448,955 B1 | 9/2002 | Evanicky et al. |
| 6,504,586 B1 | 1/2003 | Lee |
| 6,506,059 B1 | 1/2003 | Bishop et al. |
| 6,523,976 B1 | 2/2003 | Turnbull et al. |
| 6,636,283 B1 * | 10/2003 | Sasagawa et al. ............ 349/65 |
| 6,802,619 B1 * | 10/2004 | Ohizumi et al. .............. 362/31 |
| 2003/0174491 A1 * | 9/2003 | Ohizumi et al. .............. 362/31 |

OTHER PUBLICATIONS

"Engineering/Production Capabilities for Display Backlighting Requirements," Global Lighting Technologies Inc., 2 pages, May 2002.

* cited by examiner

DISPLAY RETAINER AND BACKLIGHT

FIELD OF THE INVENTION

The present invention relates generally to the field of illumination devices for display panels. More specifically, the present invention relates to simplified backlighting devices for supporting and illuminating a display panel within an appliance.

BACKGROUND OF THE INVENTION

Display panels such as liquid crystal displays (LCDs) are commonly used in appliances such as thermostats, watches, pagers, cellular telephones, video cameras, etc. to display information. Such devices are generally supported by a retainer housing, which sometimes orients the display panel at a particular angle within an appliance for increased visibility by the user. In a thermostat designed to mount to a wall surface, for example, a display retainer may be configured to orient the surface of the LCD panel in a slight upward direction to improve the viewing angle from above. A backlighting device including one or more light emitting diodes (LEDs) is typically mounted to a light guide plate that acts as an optical waveguide to illuminate the backside of the LCD panel. A diffusive pattern of ridges, grooves or dots on the light guide plate is often used to disperse the light rays in a relatively uniform manner across the backside of the LCD panel. The light guide plate and LCD panel are typically received and retained by a separate retainer housing.

The LEDs used to supply light to the backlighting device are typically secured into the light guide plate, and then manually connected to the circuit board. Connection of the LEDs to the circuit board is generally accomplished by either manually soldering the LED leads directly to the circuit board, or by hard-wiring the LED to the surface of the circuit board with the use of separate wire leads. Such techniques require the use of multiple parts that demand considerable precision to assemble, are labor intensive, and in some cases increase the cost of the device. Moreover, the use of manual soldering methods in comparison to more modern techniques used in the art require that additional steps be taken to ensure a clean contact between the various components. It is therefore advantageous to reduce the number of parts and assembly steps required to connect the display retainer and backlight to the display panel.

SUMMARY OF THE INVENTION

The present invention relates generally to the field of illumination devices for display panels. A display retainer and backlight device in accordance with an illustrative embodiment of the present invention includes one or more light pipes operatively coupled to a retainer housing that is adapted to support and illuminate a display panel. The retainer housing may include a plurality of support legs configured to attach to the surface of a printed circuit board. In certain embodiments, the support legs can be configured to orient the display panel at a particular angle within the appliance.

The retainer housing functions as an optical waveguide to disperse and reflect light received by each light pipe. The retainer housing may include a light guide plate having an upper surface, a lower surface, and a plurality of sides and ends. Light rays collected in the light pipe may be reflected and collimated towards one or more of the sides and/or ends to illuminate the body of the light guide plate. A reflector element formed integrally with or attached to the bottom surface of the light guide plate may be employed to reflect the light rays towards the backside of the display panel. A light scattering element such as an array of dots or a series of ridges or grooves may also be employed to disperse the light rays uniformly across the light guide plate and through the display panel.

The number and arrangement of the light pipes may be selected to vary the brightness and/or uniformity of the backlight. In certain embodiments, for example, multiple light pipes may be employed to supply light to different regions of the light guide plate. The size of each light pipe may also be selected to provide a particular illumination characteristic. In one illustrative embodiment, a light pipe embedded within one or more of the support legs can be utilized to direct light into the light guide plate.

In use, each light pipe may be aligned with one or more light sources (e.g. LEDs), preferably mounted on the circuit board. Each light pipe may include an entrance having one or more openings that collect light emitted from the light source(s). Light rays collected by the light pipe are directed into the light guide plate, which disperses and reflects the light rays towards the backside and through the display panel. A slot disposed through a portion of the retainer housing may be configured to receive an elastomeric zebra-strip, which electrically connects leads on the surface of the circuit board with a corresponding set of leads on the display panel. The slot may include a plurality of bumps configured to grip the zebra-strip when inserted and compressed therein.

DETAILED DESCRIPTION OF THE INVENTION

The following description should be read with reference to the drawings, in which like elements in different drawings are numbered in like fashion. The drawings, which are not necessarily to scale, depict selected embodiments and are not intended to limit the scope of the invention. Although examples of construction, dimensions, and materials are illustrated for the various elements, those skilled in the art will recognize that many of the examples provided have suitable alternatives that may be utilized.

Figure 1:
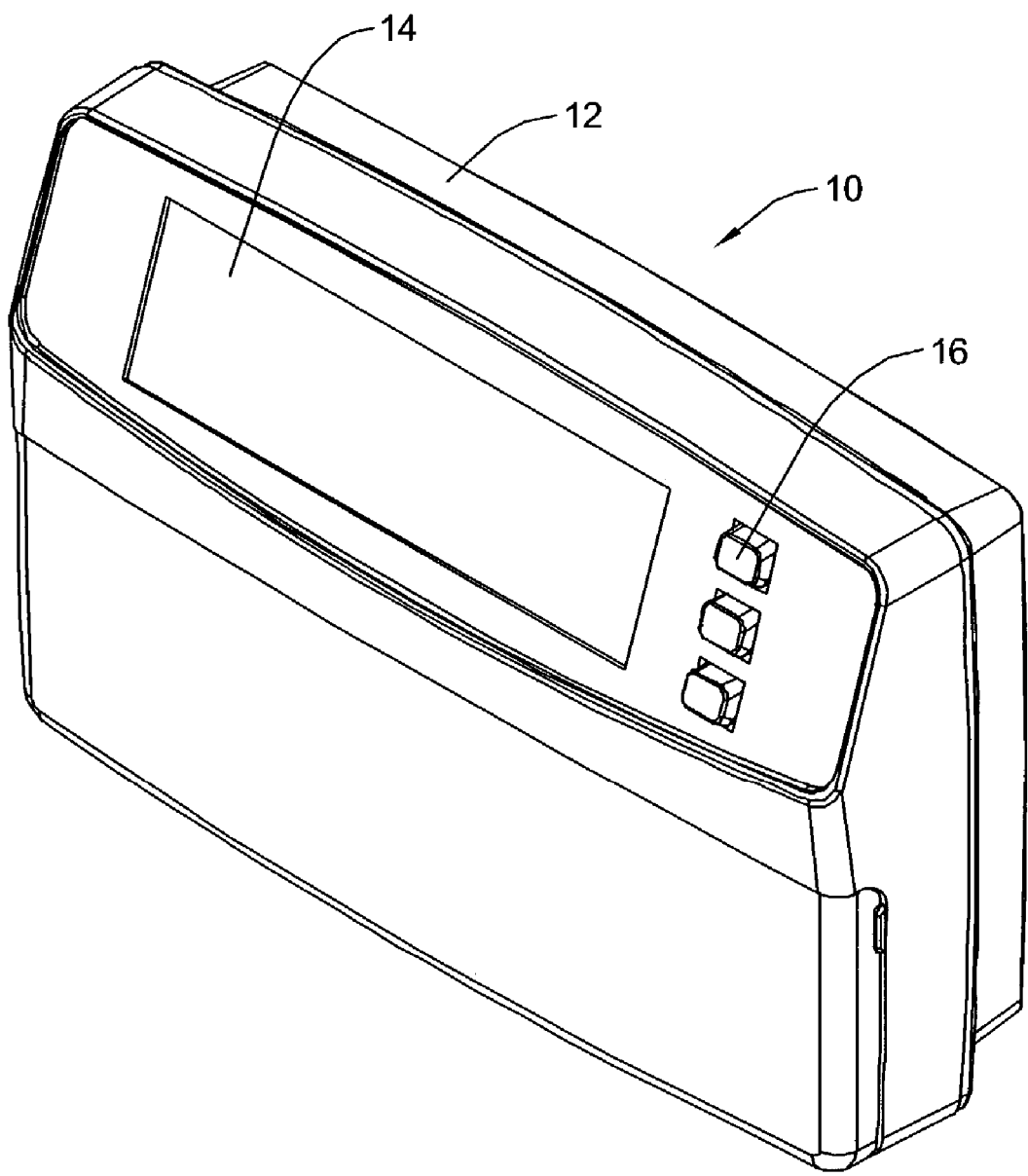
FIG. 1 is a perspective view of a thermostat employing an angled LCD panel.

FIG. 1 is a perspective view of an appliance 10 employing a separate display retainer and backlight for supporting and illuminating a display panel. Appliance 10, illustratively a wall-mounted thermostat, includes a housing 12 containing an LCD panel 14 and an interface panel 16 operatively connected to a printed circuit board disposed within the housing 12. As shown in FIG. 1, the LCD panel 14 may be oriented at a slight upward angle within the housing 12 to improve the viewing angle from above when the appliance 10 is attached to a wall. A separate display retainer and backlight (not shown) disposed behind the LCD panel 14 may be used to illuminate the LCD panel 14 at night, and to increase the visibility of the LCD panel 14 during daytime use.

Figure 2:
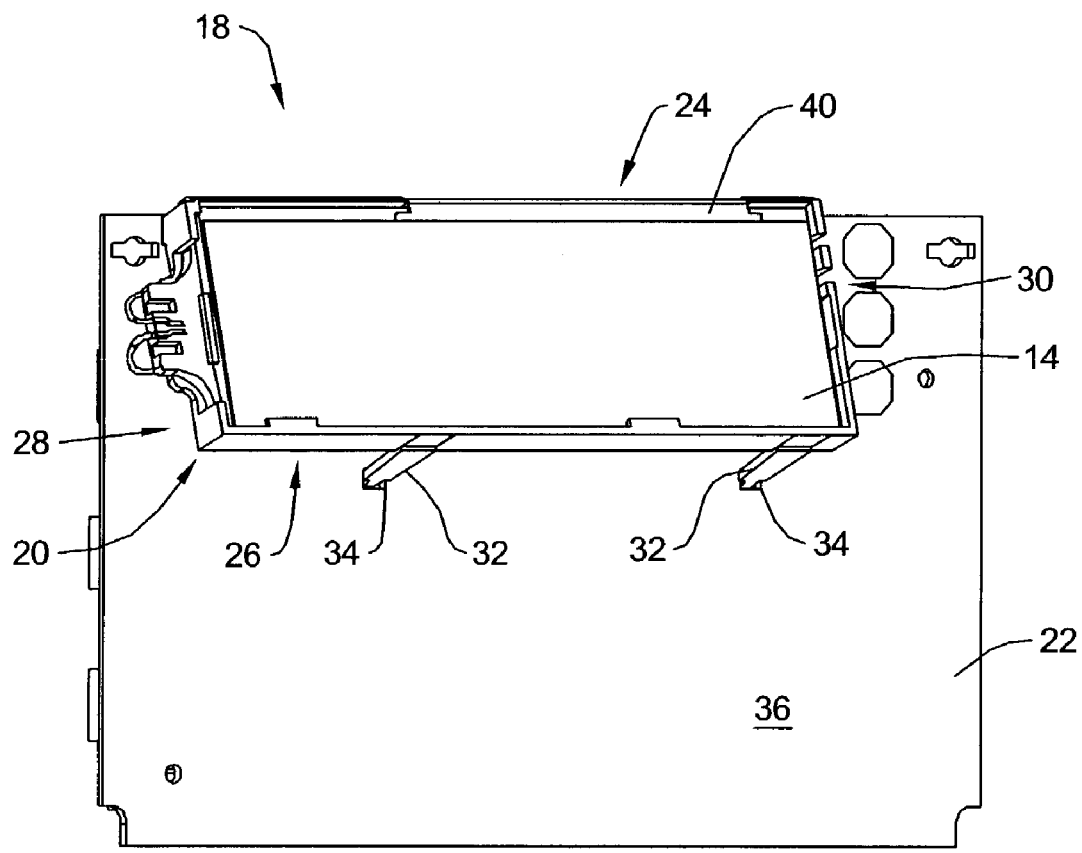
FIG. 2 is a perspective view of a prior art display retainer and backlight assembly mounted to a circuit board.

FIG. 2 is a perspective view of a conventional prior art display retainer and backlight assembly 18 for use in supporting and illuminating a display panel such as the LCD panel 14 illustrated in FIG. 1. Display retainer and backlight assembly 18 includes a retainer housing 20 configured to support the LCD panel 14 adjacent and at a slight angle relative to a printed circuit board 22. The retainer housing 20 includes an upper side 24, a lower side 26, a first end 28, and a second end 30. A first set of support legs 32 extending below the lower side 26 of the retainer housing 20 is configured to fit within a first set of notches or holes 34 formed in the surface 36 of the printed circuit board 22. A similar but shorter set of legs (not shown) extending below the upper side 24 of the retainer housing 20 is configured to fit within a second set of notches or holes 38 (see FIG. 3) formed in the surface 36 of the printed circuit board 22. A clip 40 may be employed to fasten the display retainer and backlight assembly 18 and accompanying LCD panel 14 to the printed circuit board 22.

Figure 3:
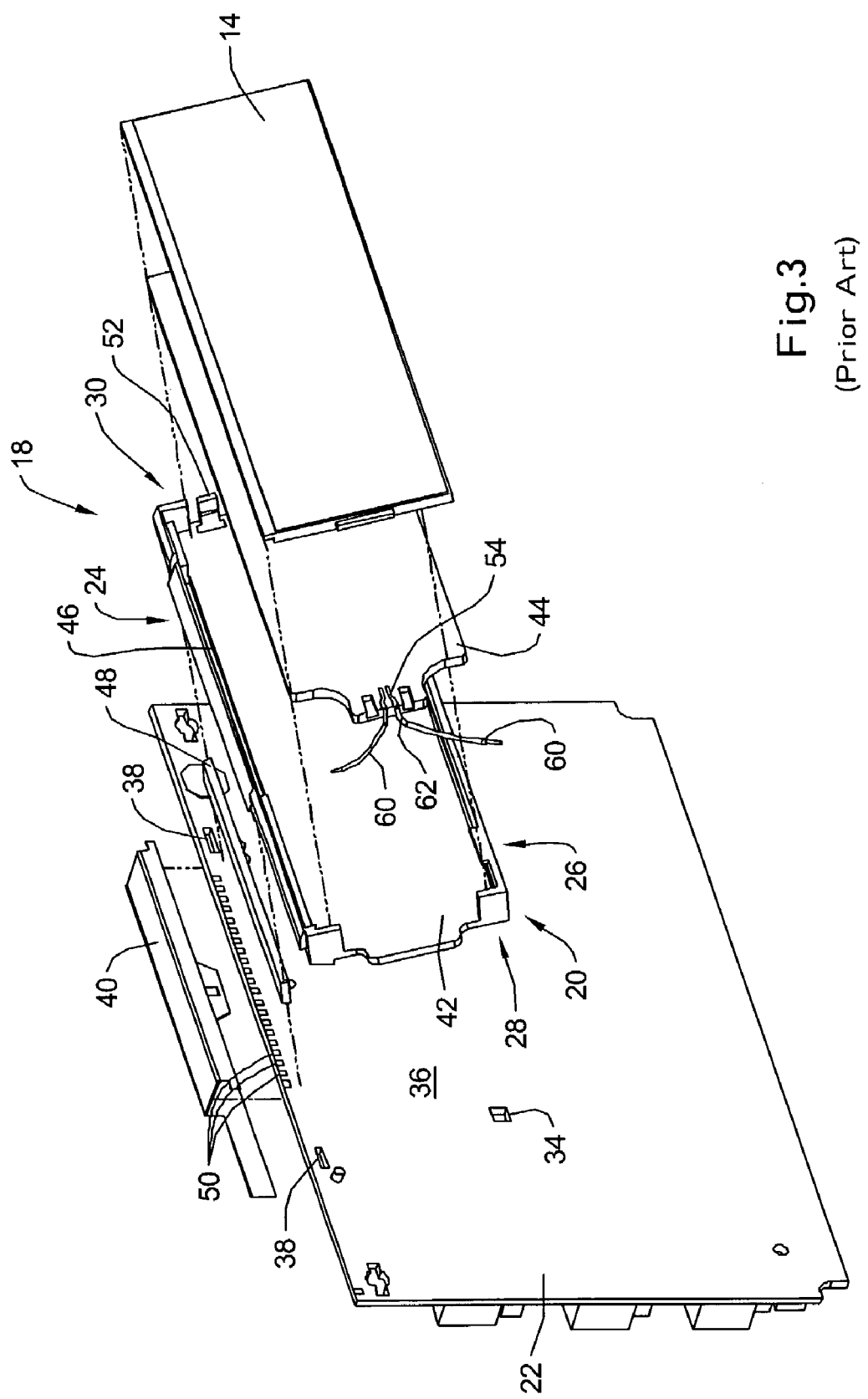
FIG. 3 is an assembly view showing the various components of the prior art display retainer and backlight assembly of FIG. 2.

FIG. 3 is an assembly view of the display retainer and backlight assembly 18 of FIG. 2. As shown in FIG. 3, the retainer housing 20 further includes a recessed backing 42 that supports and retains the LCD panel 14 and a light guide plate 44. The upper side 24 of the retainer housing 20 includes a slot 46 therethrough configured to receive an elastomeric zebra-strip 48, which electrically connects several leads 50 on the surface 36 of the printed circuit board 22 with a matching set of leads on the underside of the LCD panel 14. A locking tab 52 is used, in addition to the clip 40, to secure the light guide plate 44 and LCD panel 14 to the retainer housing 20.

In the particular prior art display retainer and backlight assembly of FIGS. 2–3, a light emitting diode (LED) 54 is shown coupled directly to the light guide plate 44. The light guide plate 44 functions as an optical waveguide, directing light rays emitted from the LED 54 towards the backside and through the LCD panel 14. The LED 54 is typically insert-molded into the light guide plate 44, and then hard-wired to the printed circuit board 22 using separate lead wires 60. A small piece of heat-shrink tubing 62 disposed about one or both of the lead wires 60 may be used to prevent the leads of the LED 54 from shorting during use.

To assemble the device, the light guide plate 44 and LCD panel 14 are inserted into the retainer housing 20 and locked into place with the aid of the locking tab 52. The elastomeric zebra-strip 48 is then inserted into the slot 46 on the upper side 24 of the retainer housing 20. The retainer housing 20, light guide plate 44 and LCD panel 14 are then attached to the printed circuit board 22 and fastened together using the clip 40.

Because the LED 54 is mounted directly to the light guide plate 44, an additional soldering step is required to attach the lead wires 60 to the printed circuit board 22. Such process generally requires the assembler to manually solder the lead wires 60 to the printed circuit board 22 with solder and flux, increasing the time and precision involved in comparison to more modern soldering methods such as wave soldering. Moreover, manually soldering the lead wires 60 to the printed circuit board 22 requires greater quality control to prevent shorting and to ensure clean contacts between the various components. The use of a separate retainer housing 20 and light guide plate 44 to support and illuminate the LCD panel 14 also increases the number of steps and components required for assembly.

Figure 4:
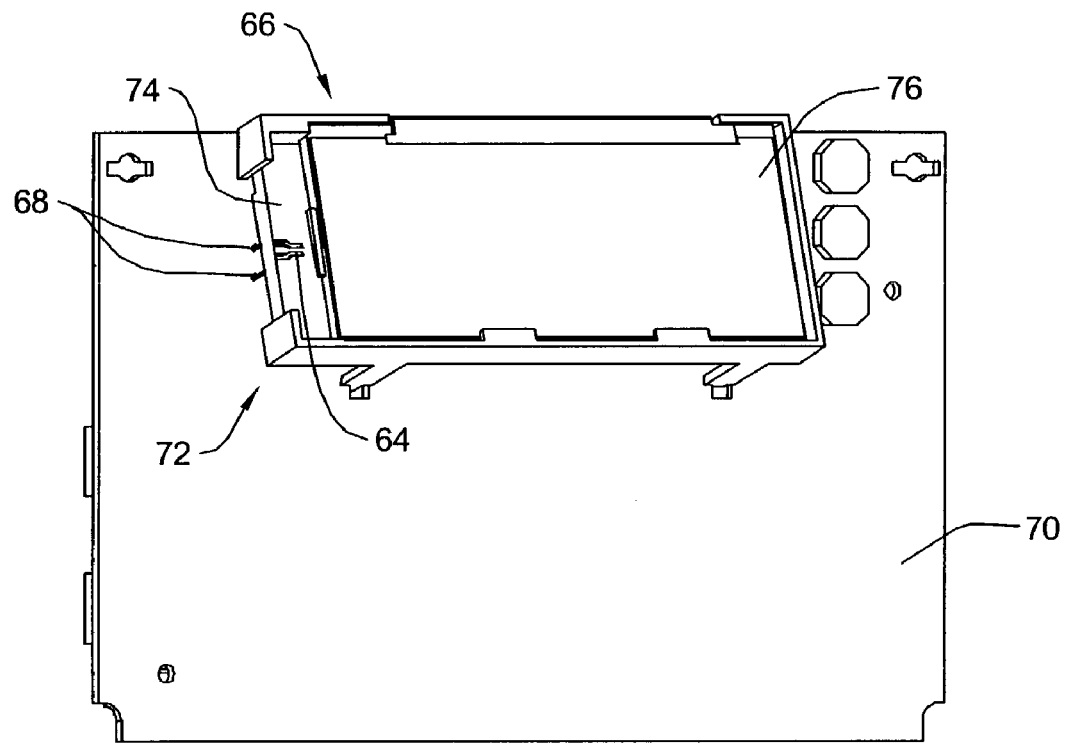
FIG. 4 is a perspective view of another prior art display retainer and backlight assembly mounted to a circuit board.

FIG. 4 is a perspective view of another prior art display retainer and backlight assembly 66 employing an LED 64 having a set of LED leads 68 mounted directly to a printed circuit board 70. Display retainer and backlight assembly 66 includes a retainer housing 72 configured to support an attached light guide plate 74 and LCD panel 76. As shown in FIG. 4, the LED 64 is mounted directly to the light guide plate 74 using, for example, an insert-molding process, and is then connected to the printed circuit board 70 using the LED leads 68.

While connecting the LED leads 68 directly to the printed circuit board 70 obviates the need to use separate lead wires, additional assembly steps may be required to ensure that the LED leads 62 are properly sized when connected to the printed circuit board 70. Moreover, connecting the LED leads 68 directly to the printed circuit board 70 requires the assembler to manually solder leads 68 to the printed circuit board 70, increasing the amount of labor and precision necessary to assemble the device.

Figure 5:
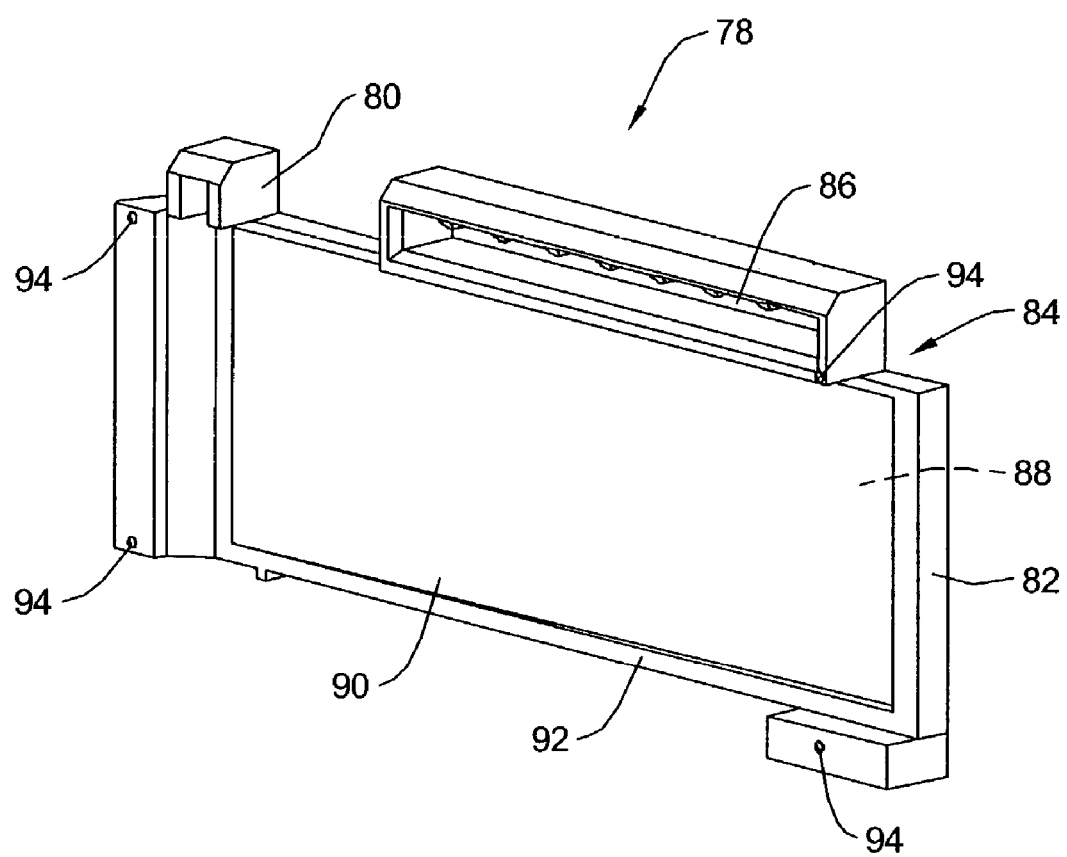
FIG. 5 is a perspective view of a prior art backlight assembly employing a light pipe and light guide plate.

FIG. 5 is a perspective view of a prior art backlighting assembly 78 employing a light pipe 80 coupled to a light guide plate 82. As shown in FIG. 5, the upper side 84 of the light guide plate 82 includes a slot 86 therethrough configured to receive an elastomeric zebra-strip, and a light pipe 80 that collects light rays emitted from a light source mounted on the surface of a printed circuit board (not shown). Light received in the light pipe 80 is directed edgewise into the light guide plate 82, and is reflected towards the upper surface 88 of the light guide plate 82 via a reflective strip 90 adhesively mounted to the bottom surface 92 of the light guide plate 82.

Unlike the prior art designs illustrated in FIGS. 2–4, backlight assembly 78 is configured to mount flush along the surface of the printed circuit board with the aid of several support prongs 94 that extend from the bottom surface 92 of the light guide plate 82. The upper surface 88 of the light guide plate 82 is relatively flat, lacking any structure to secure the display panel to the light guide plate 82. As such, additional fasteners must be employed to secure the display panel to the light guide plate 82, increasing the amount of labor and steps required to assemble the device. Moreover, since the light guide plate 82 is configured to mount flush along the surface of the printed circuit board, additional modifications may need to be made to the appliance housing and/or printed circuit board to orient the display panel at a particular viewing angle.

Figure 6:
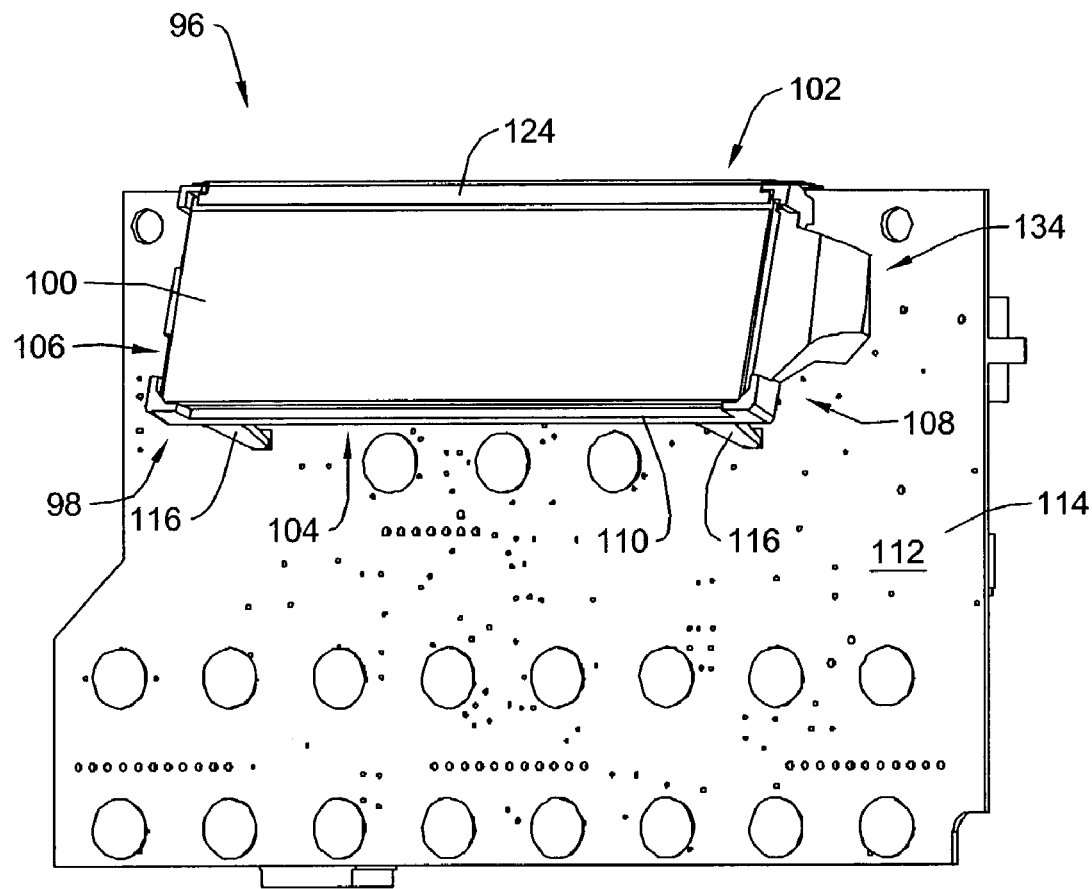
FIG. 6 is a perspective view of a display retainer and backlight in accordance with an illustrative embodiment of the present invention.

Referring now to FIG. 6, a display retainer and backlight in accordance with an illustrative embodiment of the present invention will now be described. Display retainer and backlight 96 includes a retainer housing 98 configured to support and retain a display panel 100 such as an LCD panel. In addition to supporting and retaining the display panel 100, the display retainer and backlight 96 also illuminates the display panel 100, obviating the need for a separate backlight assembly as discussed above.

In the illustrative embodiment of FIG. 6, the retainer housing 98 includes an upper side 102, a lower side 104, a first end 106 and a second end 108, which together form a frame configured to support the display panel 100 against a light guide side plate 110. The retainer housing 98 may be attached to the surface 112 of a printed circuit board 114 to orient the display panel 100 at a particular viewing angle within an appliance housing, such as housing 12 depicted in FIG. 1.

Figure 7:
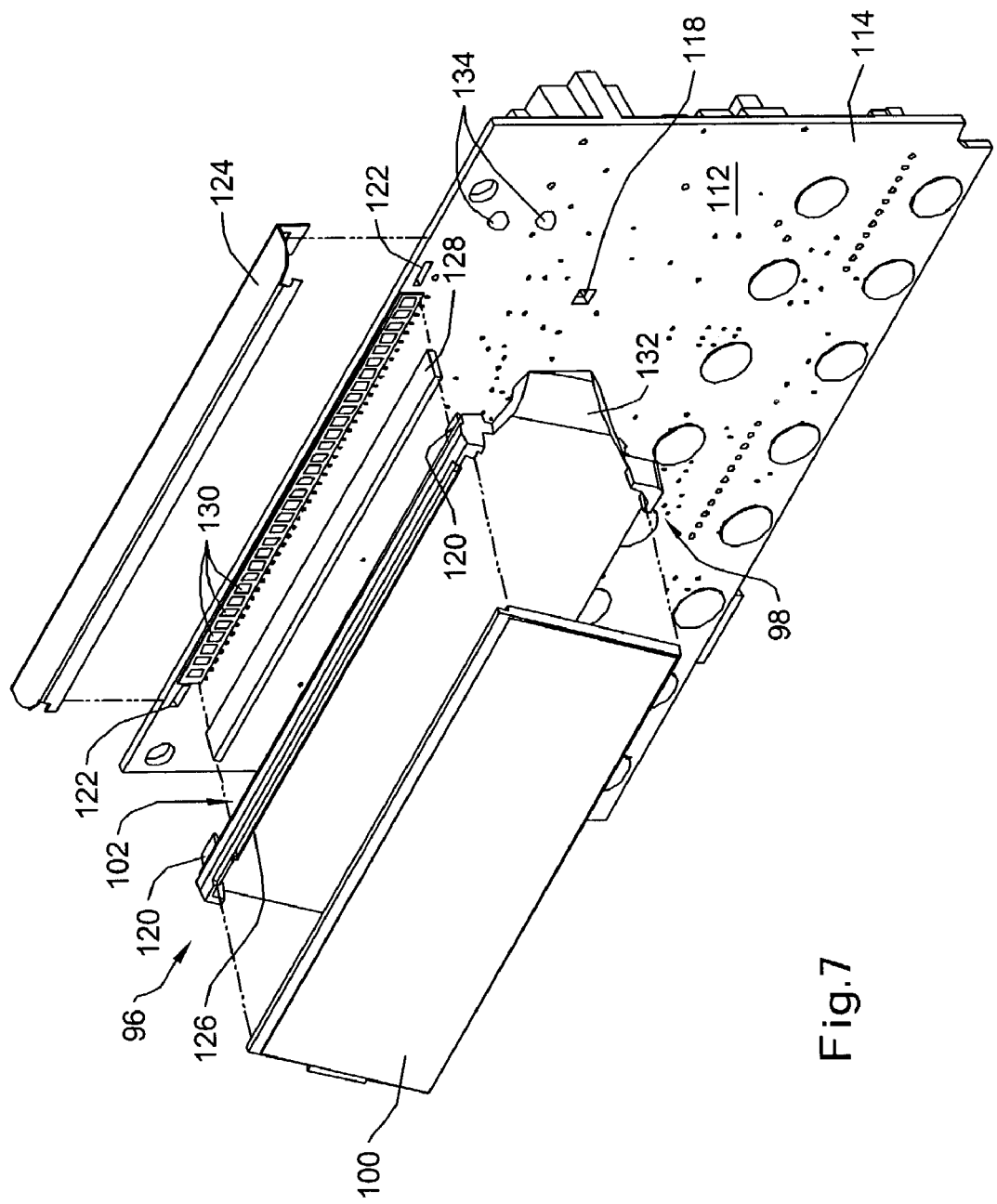
FIG. 7 is an assembly view showing the various components of the display retainer and backlight of FIG. 6.

FIG. 7 is an assembly view showing the various components of the display retainer and backlight 96 of FIG. 6. As shown in FIG. 7, the retainer housing 98 may include a first set of support legs 116 (see FIG. 6) configured to engage a first set of notches or holes 118 formed in the printed circuit board 114. A second set of support legs 120 configured similar to the first set of support legs 116 but of generally shorter length is configured to engage a second set of notches or holes 122 formed in the printed circuit board 114. The lengths of the first and second sets of support legs 116,120 may be configured to orient the display panel 100 at a particular angle (e.g. 0°, 10°, 20°, etc.) relative to the surface 112 of the printed circuit board 114. A clip 124 configured to fasten the retainer housing 98 and display panel 100 to the printed circuit board 114 may be utilized to hold the components together, once assembled.

As can be further seen in FIG. 7, a slot 126 extending through the upper side 102 of retainer housing 98 may be configured to receive an elastomeric zebra-strip 128, which electrically connects the display panel 100 to several leads 130 on the surface 112 of the printed circuit board 114. The elastomeric zebra-strip 128 includes several electrically conductive filaments therein that contact the circuit board leads and display panel leads when compressed within the slot 126. In certain embodiments, the slot 126 can be dimensioned to tightly receive the elastomeric zebra-strip 128.

A light pipe 132 operatively coupled to the retainer housing 98 may be used to collect light from one or more light sources 134 disposed on the printed circuit board 114. The light pipe 132 may be configured to collect light rays emitted by the one or more light sources 134, and direct the light rays into the retainer housing 98 to illuminate the backside of the display panel 100.

The one or more light sources 134 may include any suitable light source, such as light emitting diodes (LEDs) mounted to the printed circuit board 114. The LEDs can be selected to emit light rays at one or more wavelengths (i.e. colors) to vary the luminance characteristic of the backlighting. In certain embodiments, for example, the one or more light sources 134 may include organic light emitting diodes (OLEDs), which can be configured to emit light at multiple wavelengths to simulate white-light.

The one or more light sources 134 can be mounted to the surface 112 of the circuit board 114, as shown in FIG. 7, or in the alternative, can be mounted to the back side of the printed circuit board 114 and projected upwardly through an opening formed in the surface 112 of the printed circuit board 114. A suitable mounting process such as IR reflow, wave soldering, paste-in-hole, etc. can be used to mount the one or more light sources 134 to the printed circuit board 114, if desired.

Although the use of two LED light sources 134 is illustrated in the illustrative embodiment of FIG. 7, it should be understood that any number or type of light sources may be utilized. In certain embodiments, for example, a single light source may be used to emit light rays into the light pipe 132. In other embodiments, multiple light sources may be employed to emit light rays into each light pipe. The one or more light sources 134 may also vary in size and/or shape, depending on the particular application.

Figure 8:
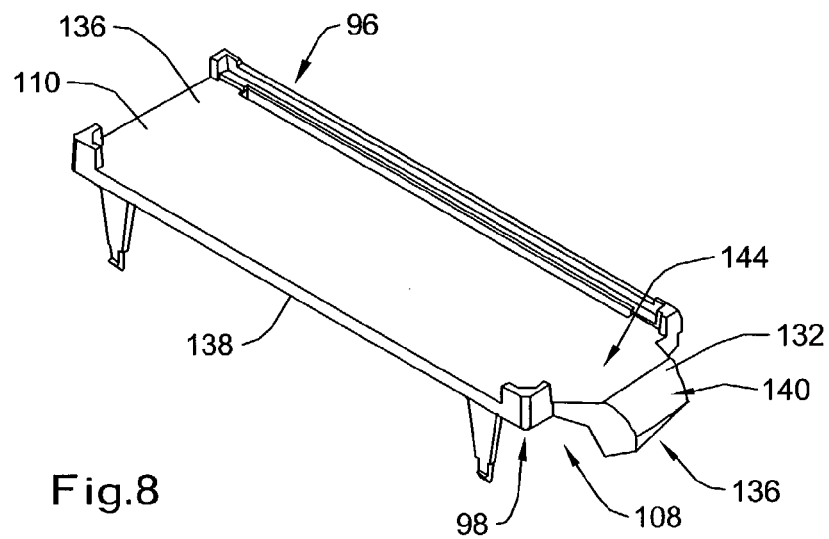
FIG. 8 is an upper perspective view of the retainer housing and light pipe illustrated in FIG. 7.

FIG. 8 is an upper perspective view of the display retainer and backlight 96 of FIG. 7. As shown in FIG. 8, the retainer housing 98 includes a light guide plate 110 having an upper surface 136 and a bottom surface 138. In the illustrative embodiment of FIG. 8, the light pipe 132 is operatively coupled to the second end 108 of the light guide plate 110. The light pipe 132 and retainer housing 98 may be formed as a single unit using, for example, an injection molding process. Alternatively, the light pipe 132 and retainer housing 98 may be formed as separate elements and then connected together by adhesive or other suitable bonding process.

The light pipe 132 may include a curved portion 140 adapted to reflect or otherwise direct light received from entrance 136 to an exit 144. The internal structure of the light pipe 132 can be configured to reflect light therein to help prevent light rays from escaping from the light pipe 132. Using principles of Total Internal Reflection (TIR), for example, light rays collected within the light pipe 132 can be deflected at angles less than the critical angle, helping to prevent the light rays from refracting and escaping from the light pipe 132.

The light pipe 132 and retainer housing 98 may be formed of any suitable transparent material including, for example, polycarbonate, acrylic, styrene acrylonitrile thermoplastic, acrylonitrile butadiene styrene (ABS), etc. This may help prevent absorption of light rays as they are passed through the light pipe 132 and light guide plate 110. The light pipe 132 can be shaped such that the outputted light rays are distributed relatively uniformly across the exit 144, if desired. The light pipe 132 can also be configured to collimate the light rays as they are outputted through the exit 144, if desired.

The dimensions of the light guide plate 110 can also be selected to control the uniformity and brightness of light rays as they are passed across the backside of the display panel 100. In certain embodiments, for example, the thickness of the light guide plate 110 can be varied to adjust the amount or orientation of light rays reflected towards the backside of the display panel 100 in order to provide greater or less illumination to particular locations of the display panel 100.

Figure 9:
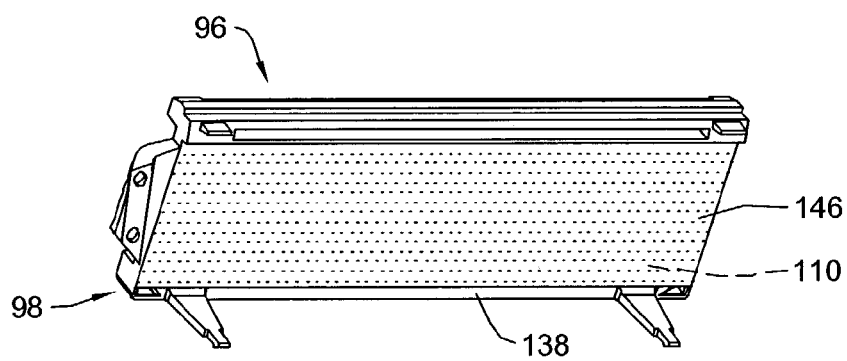
FIG. 9 is a bottom perspective view of the retainer housing and light pipe illustrated in FIG. 7.

FIG. 9 is a bottom perspective view of the angled display retainer and backlight 96 of FIG. 6. As shown in FIG. 9, the retainer housing 98 may also include a reflector element 146 configured to direct light rays from the light guide plate 110 towards the backside of the display panel 100. In certain embodiments, the reflector element 146 may include a strip of white reflective tape adhesively mounted to the bottom surface 138 of the light guide plate 110. In other embodiments, the reflector element 146 may include a piece of foil (e.g. aluminum foil) having a specular reflective surface. In one illustrative embodiment, the reflector element 146 may include a white glass-filled material formed integral with the bottom surface 138 of the light guide plate 110.

Figure 10:
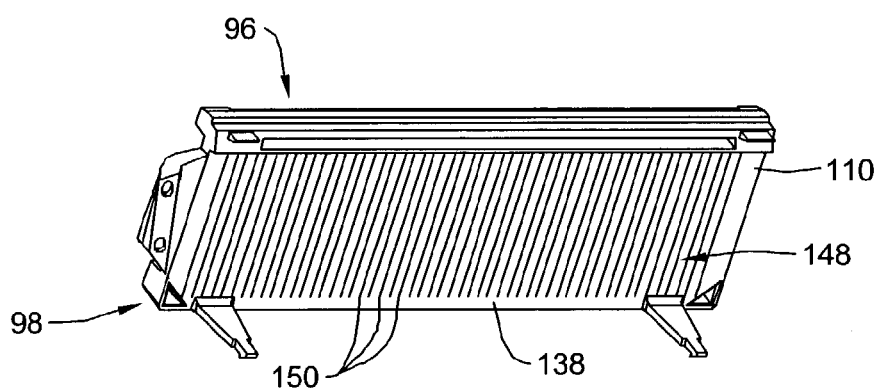
FIG. 10 is another bottom perspective view of the retainer housing and light pipe illustrated in FIG. 7, wherein the reflector element has been illustratively removed to show the light dispersive element.

FIG. 10 is another bottom perspective view of the angled display retainer and backlight 96 of FIG. 6, wherein the reflector element 146 has been illustratively removed to show a light dispersive pattern 148 on the light guide plate 110. In the illustrative embodiment illustrated in FIG. 10, the light dispersive pattern 148 includes a plurality of grooves or ridges 150 formed along the bottom surface 138 of the light guide plate 110. In use, light rays outputted from the light pipe 132 are reflected by the grooves or ridges 150, causing them to disperse within the light guide plate 110. As shown in FIG. 10, the grooves or ridges 150 can be arranged in series to provide uniform luminance to the backside of the display panel 100.

Although the illustrative embodiment illustrated in FIG. 10 employs a series of grooves or ridges 150 to disperse light within the light guide plate 110, other light dispersive patterns may be employed. In certain embodiments, for example, the light dispersive element 148 may include a plurality of dispersive dots formed along the bottom surface 138 of the light guide plate 110. The dispersive dots may be arranged in an array to disperse the light rays uniformly across the backside of the display panel 100, and to potentially reduce or eliminate any moire effect or interference through the pixels of the display panel 100.

Figure 11:
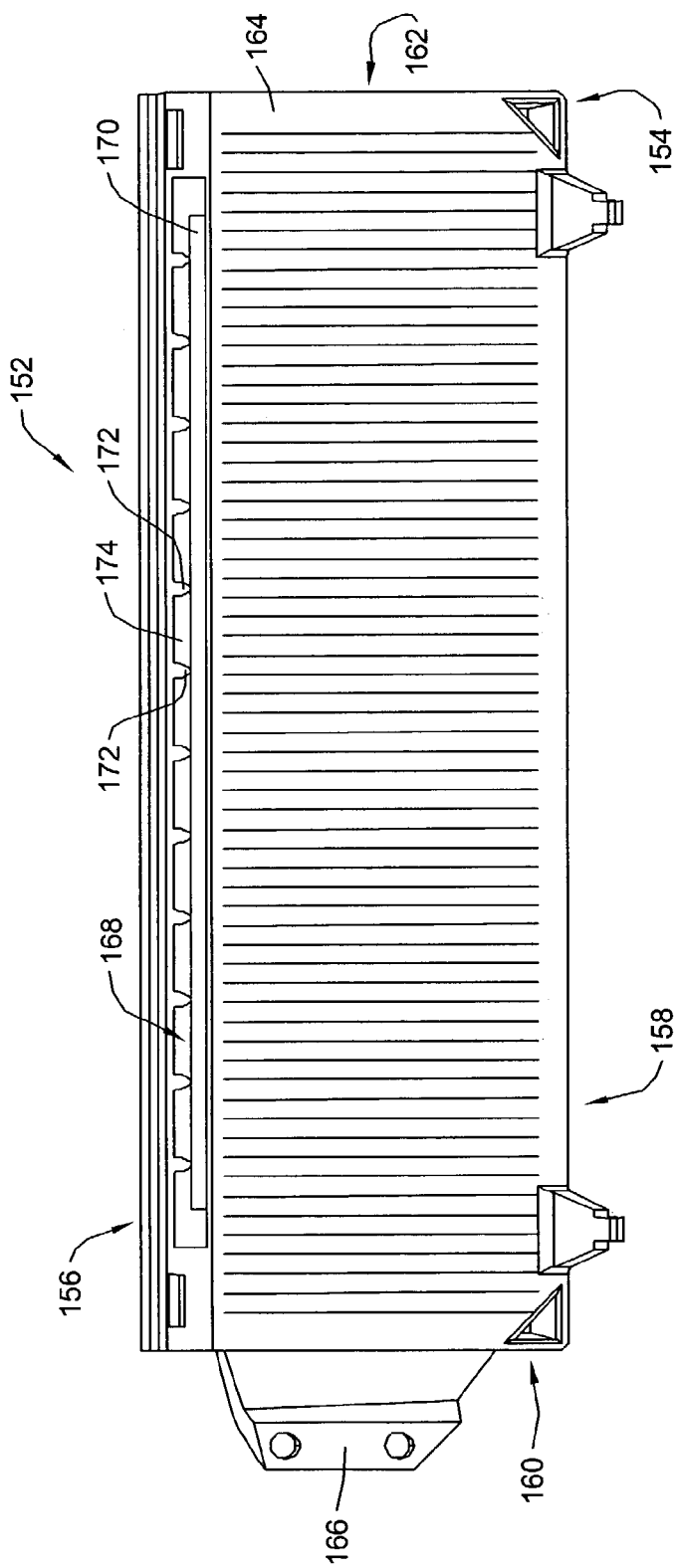
FIG. 11 is a bottom perspective view of a display retainer and backlight in accordance with an illustrative embodiment of the present invention having a retaining slot.

FIG. 11 is a bottom perspective view of a display retainer and backlight 152 in accordance with another illustrative embodiment of the present invention. Display retainer 152 includes a retainer housing 154 having an upper side 156, a bottom side 158, a first end 160, and a second end 162. Retainer housing 154 further includes a light guide plate 164 and light pipe 166, similar to that described above with respect to the embodiment of FIG. 8.

In the illustrative embodiment of FIG. 11, retainer housing 154 further includes a retaining slot 168 configured to receive an elastomeric zebra-strip 170. The retaining slot 168 may include a plurality of bumps 172 protruding inwardly within the slot 168 that engage the elastomeric zebra-strip 170 when the elastomeric zebra-strip 170 is inserted and compressed therein. A space 174 disposed between each bump 172 provides relief when the elastomeric zebra-strip 170 is compressed in the retaining slot 168 by clip 124 (see FIG. 5). The dimensions of retaining slot 168 and/or bumps 172 may be selected to receive zebra-strips of varying dimension, as desired.

Figure 12:
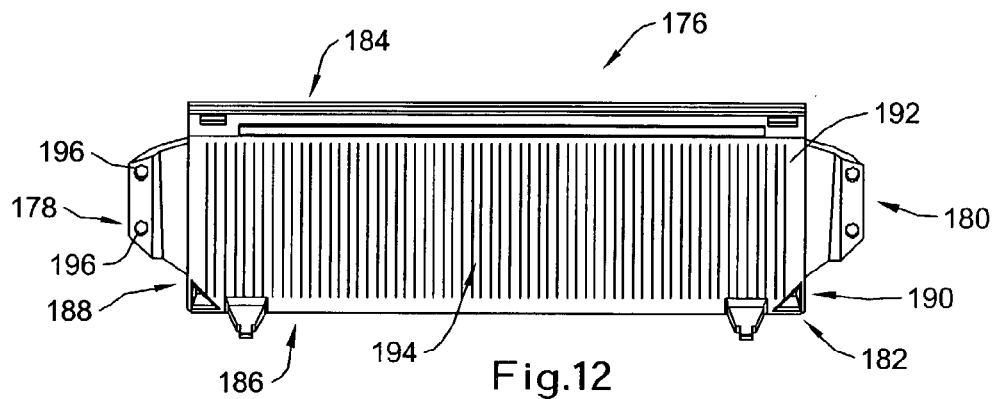
FIG. 12 is a bottom perspective view of a display retainer and backlight in accordance with an illustrative embodiment of the present invention employing multiple light pipes.

FIG. 12 is a bottom perspective view of a display retainer and backlight 176 in accordance with an illustrative embodiment of the present invention employing a plurality of light pipes 178,180. Display retainer and backlight 176 includes a retainer housing 182 having an upper side 184, a lower side 186, a first end 188, and a second end 190. Retainer housing 182 further includes a light guide plate 192 that functions as an optical waveguide to direct light rays from the light pipes 178,180 towards an attached display panel. As with the previous embodiments, the light guide plate 192 may include a reflector element (not shown) and light dispersive element 194 to reflect and disperse light rays within the light guide plate 192 toward a display (e.g. LCD) panel (not shown).

In the illustrative embodiment, the first light pipe 178 is operatively coupled to the first end 188 of the retainer housing 182, and is configured to direct light towards the second end 190 of the light guide plate 192. The first light pipe 150 may include one or more openings 196 configured to receive light from one or more light sources (e.g. LEDs) mounted on the circuit board. The second light pipe 180 is operatively coupled to the second end 190 of the retainer housing 182, and is configured to direct light towards the first end 188 of the light guide plate 192. In use, the first and second light pipes 178,180 may increase the brightness and uniformity of light rays within the light guide plate 192.

Figure 13:
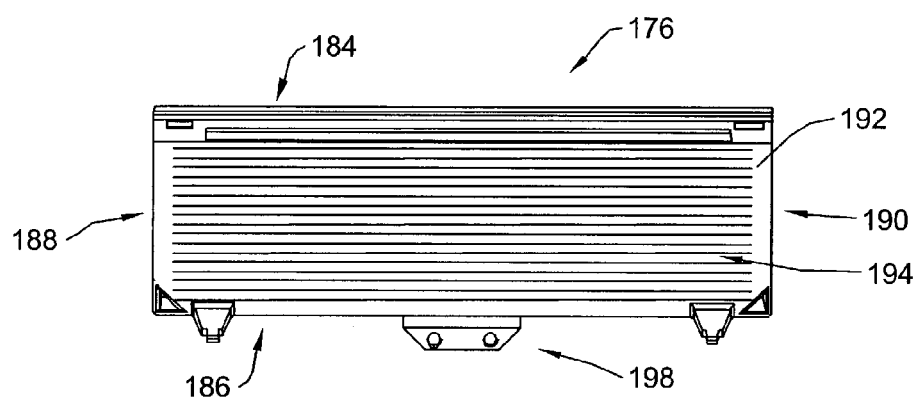
FIG. 13 is a bottom perspective view of a display retainer and backlight in accordance with an illustrative embodiment of the present invention employing a light pipe operatively coupled to the side of the light guide plate.

The positioning of the various light pipe(s) may also be selected to change the characteristics of the backlighting. As shown in FIG. 13, for example, the display retainer and backlight 176 may include a light pipe 198 mounted on the lower side 186 of the retainer housing 182. In use, light collected by the light pipe 198 is directed towards the upper side 184 of the light guide plate 192.

Figure 14:
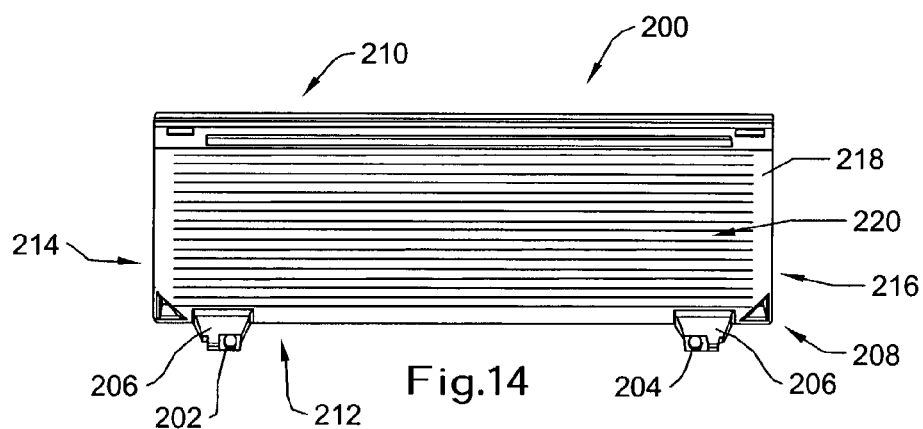
FIG. 14 is a bottom perspective view of a display retainer and backlight in accordance with an illustrative embodiment of the present invention employing light pipes embedded within the support legs.

FIG. 14 is a perspective view of a display retainer and backlight 200 in accordance with another illustrative embodiment of the present invention having light pipes 202,204 embedded within the support legs 206. Display retainer and backlight 200 includes a retainer housing 208 having an upper side 210, a lower side 212, a first end 214, and a second end 216. Retainer housing 200 further includes a light guide plate 218 that functions as an optical waveguide to direct light rays from the light pipes 202,204 towards an attached display panel. A reflector element (not shown) and light dispersive element 220 are configured to reflect and disperse light within the light guide plate 218, similar to other embodiments described herein.

As shown in FIG. 14, the light pipes 202,204 may be embedded within the support legs 206 to illuminate the light guide plate 218. The light pipes 202,204 may be formed integral with the retainer housing 208, or may be formed as separate elements that are later coupled together. As with any of the other embodiments described herein, the location and positioning of the light pipes 202,204 may be selected to vary the characteristics of the backlight.

Having thus described the several embodiments of the present invention, those of skill in the art will readily appreciate that other embodiments may be made and used which fall within the scope of the claims attached hereto. Numerous advantages of the invention covered by this document have been set forth in the foregoing description. It will be understood that this disclosure is, in many respects, only illustrative. Changes may be made in details, particularly in matters of shape, size and arrangement of parts without exceeding the scope of the invention.

What is claimed is:

1. A display retainer and backlight device, comprising:
   at least one light pipe for collecting light rays emitted from an external light source; and
   a retainer housing optically coupled to said at least one light pipe, said retainer housing including an optical waveguide and configured to retain a display panel relative to a major surface of a circuit board and to illuminate the display panel; said retainer housing including a mount that orients the retainer housing such that the retained display panel is not parallel with the major surface of the circuit board.

2. The display retainer and backlight device of claim 1, wherein said at least one light pipe and retainer housing are formed of a transparent material.

3. The display retainer and backlight device of claim 1, wherein said external light source comprises one or more light emitting diodes.

4. The display retainer and backlight of claim 1, further comprising a light scattering element for dispersing light rays within or from the optical waveguide.

5. The display retainer and backlight device of claim 4, wherein said light scattering element comprises a series of ridges or grooves.

6. The display retainer and backlight device of claim 4, wherein said light scattering element comprises an array of dispersive dots.

7. The display retainer and backlight device of claim 1, wherein said display panel is a liquid crystal display panel.

8. The display retainer and backlight device of claim 1, wherein said mount includes means for mounting the retainer housing such that the retained display panel is not parallel with the major surface of the circuit board.

9. The display retainer and backlight device of claim 8, wherein said means for mounting the retainer housing comprises a plurality of support legs.

10. The display retainer and backlight device of claim 9, wherein said plurality of support legs comprises a first set of support legs configured to engage a first set of notches or holes on the circuit board, and a second set of support legs of shorter length than the first set of support legs configured to engage a second set of notches or holes on the circuit board.

11. The display retainer and backlight device of claim 9, wherein said at least one light pipe is embedded within one or more of said support legs.

12. The display retainer and backlight device of claim 1, wherein at least one of said at least one light pipes includes an entrance for collecting light, and a curved portion configured to direct light rays into the optical waveguide.

13. The display retainer and backlight device of claim 1, further comprising a reflector element for reflecting light rays within or from the optical waveguide towards the display panel.

14. The display retainer and backlight device of claim 13, wherein said reflector element comprises a strip of reflective tape adhesively mounted to the optical waveguide.

15. The display retainer and backlight device of claim 13, wherein said reflector element is formed integral with the optical waveguide.

16. The display retainer and backlight device of claim 1, wherein said at least one light pipe comprises a plurality of light pipes.

17. The display retainer and backlight device of claim 1, wherein said retainer housing includes a slot configured to receive an elastomeric zebra-strip.

18. The display retainer and backlight device of claim 17, wherein said slot includes a plurality of bumps configured to tightly receive the zebra-strip.

19. A display retainer and backlight device, comprising:
at least one light pipe for collecting light rays emitted from an external light source;
a retainer housing optically coupled to said at least one light pipe, said retainer housing including an optical waveguide and configured to retain and illuminate a display panel; said retainer housing including a first major surface adjacent the display panel and a second major surface opposite the first major surface; and
a reflector element positioned along at least part of the second major surface for reflecting light rays within or from the optical waveguide towards the first major surface and the display panel; and
a light scattering element for dispersing light rays within or from the optical waveguide.

20. The display retainer and backlight device of claim 19, wherein said at least one light pipe and retainer housing are formed of a transparent material.

21. The display retainer and backlight device of claim 19, wherein said external light source comprises one or more light emitting diodes.

22. The display retainer and backlight device of claim 19, wherein said light scattering element comprises a series of ridges or grooves.

23. The display retainer and backlight device of claim 19, wherein said light scattering element comprises an array of dispersive dots.

24. The display retainer and backlight device of claim 19, wherein said display panel is a liquid crystal display panel.

25. The display retainer and backlight device of claim 19, wherein said retainer housing includes means for mounting the retainer housing relative to a circuit board with a major surface such that the supported display panel is not parallel with the major surface of the circuit board.

26. The display retainer and backlight device of claim 25, wherein said means for mounting the retainer housing relative to the circuit board comprises a plurality of support legs.

27. The display retainer and backlight device of claim 26, wherein said plurality of support legs comprises a first set of support legs configured to engage a first set of notches or holes on the circuit board, and a second set of support legs of shorter length than the first set of support legs configured to engage a second set of notches or holes on the circuit board.

28. The display retainer and backlight device of claim 26, wherein said at least one light pipe is embedded within at least one of said support legs.

29. The display retainer and backlight device of claim 19, wherein at least one of said at least one light pipes includes an entrance for collecting light, and a curved portion configured to direct light rays into the optical waveguide.

30. The display retainer and backlight device of claim 19, wherein said reflector element comprises a strip of reflective tape adhesively mounted to at least part of the second major surface of the retainer housing.

31. The display retainer and backlight device of claim 19, wherein said reflector element is formed integral with the retainer housing.

32. The display retainer and backlight device of claim 19, wherein said at least one light pipe comprises a plurality of light pipes.

33. The display retainer and backlight device of claim 19, wherein said retainer housing includes a slot configured to receive an elastomeric zebra-strip.

34. The display retainer and backlight device of claim 33, wherein said slot includes a plurality of bumps configured to tightly receive the zebra-strip.

35. A display retainer and backlight device, comprising:
at least one light pipe for collecting light rays emitted from an external light source mounted to a circuit board;
a retainer housing optically coupled to said at least one light pipe, said retainer housing including an optical waveguide and configured to support and illuminate a display panel, and one or more support legs coupled to the retainer housing configured to mount the retainer housing to the circuit board;
a light scattering element for dispersing light rays within the optical waveguide; and
a reflector element for reflecting light rays within or from the optical waveguide towards the display panel.

36. A backlighting assembly, comprising:
a circuit board;
a light guide plate attached adjacent and at an angle greater than zero relative to the circuit board, said light guide plate having a first surface and a second surface;
a display panel adjacent to the first surface of the light guide plate; and
at least one light collector coupled to the light guide plate, each light collector configured to direct light rays from an external light source into the light guide plate.

37. A backlighting assembly, comprising:
a circuit board;
a light guide plate attached adjacent and at an angle greater than zero relative to the circuit board, said light guide plate having a first surface and a second surface;
a display panel adjacent to the first surface of the light guide plate;
at least one light collector coupled to the light guide plate, each light collector configured to direct light rays from an external light source mounted on the circuit board into the light guide plate;
a light dispersive element formed within the second surface of the light guide plate; and
a reflector element coupled relative to the second surface of the light guide plate.

38. A backlighting assembly, comprising:
a circuit board;
a light guide plate attached adjacent and at an angle relative to the circuit board, said light guide plate having a first surface, a second surface, and a slot;
a display panel positioned adjacent to the first surface of the light guide plate;
a zebra-strip disposed within the slot and configured to electrically connect the display panel to the circuit board;
at least one light collector coupled to the light guide plate, each light collector configured to direct light rays from an external light source mounted on the circuit board into the light guide plate;
a light dispersive element formed within or adjacent to the second surface of the light guide plate; and
a reflector element coupled to or adjacent with the second surface of the light guide plate.

39. A method of backlighting a display panel, comprising the steps of:
providing an angled display retainer and backlight device having at least one light pipe optically coupled to a light guide plate having a first surface and a second surface, wherein the display retainer and backlight device is configured to retain the display panel adjacent the first surface of the light guide plate and at an angle greater than zero relative to a circuit board;
providing at least one light source mounted to the circuit board;
collecting light rays emitted from said at least one light source and directing the light rays into the light guide plate; and
reflecting the light rays towards the first surface of the light guide plate to backlight the display panel.

40. A method of backlighting a display panel, comprising the steps of:
providing an angled display retainer and backlight device having at least one light pipe optically coupled to a light guide plate having a first surface and a second surface, wherein the display retainer and backlight device is configured to retain the display panel adjacent the first surface of the light guide plate and at an angle greater than zero relative to a circuit board;
providing at least one light source surface mounted to the circuit board;
collecting light rays emitted from said at least one light source and directing the light rays into the light guide plate;
dispersing the light rays within the light guide plate; and
reflecting the light rays towards the first surface of the light guide plate to backlight the display panel.

41. A display retainer and backlight device, comprising:
at least one light pipe for collecting light rays emitted from an external light source; and
a retainer housing optically coupled to said at least one light pipe, said retainer housing including an optical waveguide and configured to support and illuminate a display panel; said retainer housing including means for mounting the display retainer and backlight device at an angle relative to a circuit board.

42. A display retainer and backlight device, comprising:
at least one light pipe for collecting light rays emitted from an external light source; and
a retainer housing optically coupled to said at least one light pipe, said retainer housing including an optical waveguide and configured to support and illuminate a display panel; said retainer housing having a recess for at least partially retaining and positioning the display panel relative to said retainer housing.

43. A display retainer and backlight device, comprising:
at least one light pipe for collecting light rays emitted from an external light source; and
a retainer housing optically coupled to said at least one light pipe, said retainer housing including an optical waveguide and configured to illuminate and support a display panel at an angle greater than zero relative to a circuit board;
wherein each of said at least one light pipe includes an entrance for collecting light, and a curved portion configured to direct tight rays into the optical waveguide.

44. A display retainer and backlight device, comprising:
at least one light pipe for collecting light rays emitted from an external light source;
a retainer housing optically coupled to said at least one light pipe, said retainer housing including an optical waveguide and configured to illuminate and support a display panel at an angle greater than zero relative to a substrate; said retainer housing including a reflector element for reflecting light rays within or from the optical waveguide towards the display panel; and
a light scattering element for dispersing light rays within or from the optical waveguide;
wherein at least one of said at least one light pipes includes an entrance for collecting light, and a curved portion configured to direct light rays into the optical waveguide.

45. A display retainer and backlight device, comprising:
at least one light pipe for collecting light rays emitted from an external light source;
a retainer housing optically coupled to said at least one light pipe, said retainer housing including an optical waveguide and configured to support and illuminate a display panel;
a light scattering element for dispersing light rays within of from the optical waveguide; and
a reflector element for reflecting light rays within the optical waveguide towards the display panel;

wherein said retainer housing includes means for mounting the display retainer and backlight device at an angle relative to a circuit board.

46. The display retainer and backlight device of claim 1, wherein the angle is at least 10 degrees.

47. The display retainer and backlight device of claim 1, wherein the angle is at least 20 degrees.

48. The display retainer and backlight device of claim 19, wherein the angle is at least 10 degrees.

49. The display retainer and backlight device of claim 19, wherein the angle is at least 20 degrees.

50. The backlighting assembly of claim 36, wherein the angle is at least 10 degrees.

51. The backlighting assembly of claim 36, wherein the angle is at least 20 degrees.

52. The backlighting assembly of claim 37, wherein the angle is at least 10 degrees.

53. The backlighting assembly of claim 37, wherein the angle is at least 20 degrees.

54. The method of claim 39, wherein the step of providing an angled display retainer and backlight device includes retaining the display panel adjacent the first surface of the light guide plate at an angle greater than 10 degrees relative to the circuit board.

55. The method of claim 39, wherein the step of providing an angled display retainer and backlight device includes retaining the display panel adjacent the first surface of the light guide plate at an angle greater than 20 degrees relative to the circuit board.

56. The method of claim 40, wherein the step of providing an angled display retainer and backlight device includes retaining the display panel adjacent the first surface of the light guide plate at an angle greater than 10 degrees relative to the circuit board.

57. The method of claim 40, wherein the step of providing an angled display retainer and backlight device includes retaining the display panel adjacent the first surface of the light guide plate at an angle greater than 20 degrees relative to the circuit board.

* * * * *